United States Patent [19]

Tanaka et al.

[11] Patent Number: 5,034,123
[45] Date of Patent: Jul. 23, 1991

[54] FILTERING APPARATUS FOR PROCESSING LIQUIDS

[75] Inventors: Makoto Tanaka; Jun Aramaki; Shiro Imai, all of Nagoya, Japan

[73] Assignee: Mitsubishi Denki K.K., Tokyo, Japan

[21] Appl. No.: 437,576

[22] Filed: Nov. 17, 1989

[30] Foreign Application Priority Data

Nov. 17, 1988 [JP] Japan ................... 63-290506

[51] Int. Cl.$^5$ ........................................... B01D 29/35
[52] U.S. Cl. ................... 210/195.1; 210/196; 210/232; 210/241; 210/416.1
[58] Field of Search ............... 210/167, 168, 195.1, 210/196, 232, 236, 241, 248, 250, 257.1, 258, 262, 416.1, 449, 473

[56] References Cited

U.S. PATENT DOCUMENTS

| | | | |
|---|---|---|---|
| 1,611,739 | 12/1926 | Hadfield | 210/416.1 X |
| 1,652,423 | 12/1927 | Belke | 210/416.1 X |
| 2,865,511 | 12/1958 | Hopkins, Jr. | 210/416.1 |
| 2,972,411 | 2/1961 | O'Dette | 210/416.1 X |
| 3,441,141 | 4/1969 | Zimmermann et al. | 210/241 |
| 3,447,685 | 6/1969 | Bircher | 210/167 |
| 3,455,457 | 7/1969 | Popelar | 210/168 |
| 3,616,917 | 11/1971 | Hellwege | 210/167 |
| 4,282,094 | 8/1981 | Mitchell | 210/167 |
| 4,361,488 | 11/1982 | White et al. | 210/168 X |
| 4,591,434 | 5/1986 | Prudhomme | 210/167 X |
| 4,622,135 | 11/1986 | Williams | 210/167 |

FOREIGN PATENT DOCUMENTS

| | | | |
|---|---|---|---|
| 249699 | 7/1912 | Fed. Rep. of Germany | 210/416.1 |
| 0032409 | 8/1980 | Japan | 210/167 |
| 63-52928 | 3/1988 | Japan . | |
| 2146547 | 4/1985 | United Kingdom | 210/473 |

Primary Examiner—Robert Spitzer
Attorney, Agent, or Firm—Sughrue, Mion, Zinn, Macpeak & Seas

[57] ABSTRACT

A filtering apparatus for processing liquids includes filtering element which is provided outside a clean liquid tank so that the clean liquid discharged through an outlet provided at the bottom of a filter tank is stored in a clean liquid tank. It is therefore possible to prevent processing powder from falling in the clean liquid tank and contaminating the clean liquid during the work of changing the filtering element and easily perform the work of changing the filtering element while maintaining the amount of processing liquid contained in the filtering element at the minimum level. It is also possible to easily perform the maintenance of the filtering element and remove the need for a maintenance space around the filter for processing liquids.

1 Claim, 4 Drawing Sheets

FILTERING APPARATUS FOR PROCESSING LIQUIDS

BACKGROUND OF THE INVENTION

The present invention relates to an improved filtering apparatus for processing liquids.

FIG. 1 is a schematic sectional view of the configuration of a conventional filtering apparatus for processing liquids, in which a processing liquid tank 10 is divided into a contaminated liquid tank 14 and a clean liquid tank 16 by a partition plate 12 so that mixing is prevented. The contaminated liquid 18 stored in the contaminated liquid tank 14 is, for example, a processing liquid containing processing powder. In the clean liquid tank 16 is stored a clean liquid 20 which is resulted from filtering of the contaminated liquid. A pump 22 corresponding to a drawing-up means is provided in the processing liquid tank 10, the suction port side 22a thereof being immersed in the contaminated liquid 18. A filter 24 corresponding to a filtering means is provided in the clean liquid tank 16 by means of a filter fixing means 25 and is detachably fixed in such a manner that the filter 24 is immersed into the clean liquid 20. As shown in FIG. 2, the filter-fixing means 25 comprises a pipe-shaped mounting rod 27 with a hollow 26 and a mounting nut 28. The pump 22 and the filter-fixing means 25 are connected by a hose 29. A feed pump 30 serves to supply the clean liquid 20 which is resulted from filtering by the filter 24 to the body of a processing apparatus (not shown).

A description will now be given of the operation of the conventional filtering apparatus for processing liquids.

The contaminated liquid 18 which contains processing powder and which is returned from the body of the processing apparatus is stored in the contaminated liquid tank 14. The pump 22 which is constantly operated sends the contaminated liquid 18 stored to the filter-fixing means 25 through the hose 29. The contaminated liquid 18 sent to the filter-fixing means 25 is discharged in the filter 24 from the hollow 26 provided in the mounting rod 27. The contaminated liquid 18 is then filtered by the filter 24 with the aid of the pressure of the pump 22. As a result, the processing powder remains in the filter 24, and the processing liquid becomes the clean liquid 20 and is stored in the clean liquid tank 16. The clean liquid 20 is again supplied to the body of the processing apparatus (not shown) by means of the feed pump 30.

In the conventional filtering apparatus for processing liquids configured as described above, the filter 24 must be extracted from the mounting means 25 provided in the clean liquid tank 16 during the work of changing the clogged filter 24. During this work, the processing powder remaining in the filter 24 falls down into the clean liquid tank 16 and thus causes the contamination of the clean liquid 20. In addition, since the filter 24 constantly contains a processing liquid, the weight of the filter 24 is increased, and the filter 24 cannot be easily extracted. This causes the deterioration in the efficiency of the changing work and the difficulty in maintenance of the filter 24. There is also a problem in that a space for maintenance must be kept around the filter 24 for processing liquids.

SUMMARY OF THE INVENTION

The present invention has been achieved with a view to resolving the above-mentioned problems, and it is an object of the present invention to provide a filter for a processing liquid which makes the work of changing a filtering means and maintenance thereof easy without causing processing powder remaining in the filtering means to fall down into a clean liquid tank and which makes a maintenance space around the filter for processing liquids unnecessary.

To this end, there is provided a filtering apparatus for processing liquids comprising: a contaminated liquid tank for storing a contaminated liquid used in processing; filtering means for removing contaminates from the contaminated liquid to produce a clean liquid; means for supplying the contaminated liquid in the contaminated liquid tank to the filtering means; a filter tank containing the filtering means therein and having an outlet for causing the clean liquid discharged from the filtering means to flow out; and a clean liquid tank for storing the clean liquid caused to flow out from the outlet of the filter tank, the filtering means is detachably connected to the means for supplying the contaminated liquid to the filtering means and is disposed at a level higher than the surface of the clean liquid in the clean liquid tank, and the filter tank is movably supported by a support base.

DETAILED DESCRIPTION OF PREFERRED EMBODIMENTS

Figure 3:
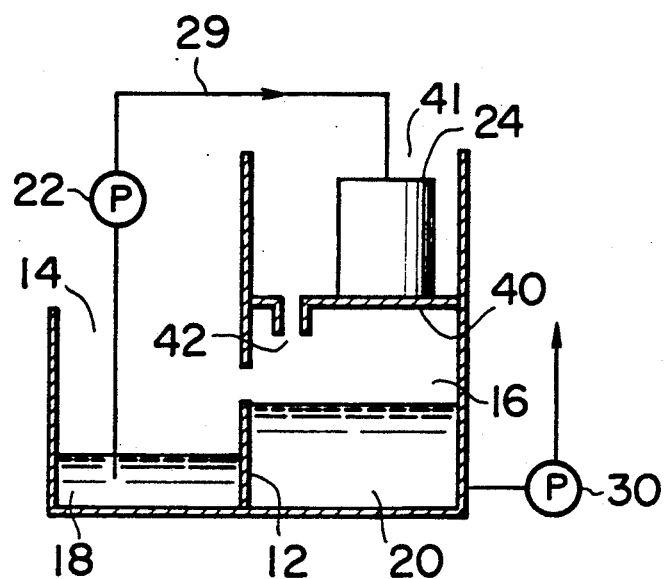
FIG. 3 is a schematic sectional view of a filtering apparatus for processing liquids in accordance with an embodiment of the present invention.

An embodiment of the present invention will be described below with reference to the drawings. In FIG. 3, a filter-providing partition plate 40 forms a filter tank 41 allows the filter 24 to be loaded thereon. In the filter-providing partition plate 40 is provided an outlet such as a shoot 42 so as to cause a clean liquid 20 filtered by filter 24 to fall into a clean liquid tank 16. At this time, the filter 24 is disposed at a level higher than the surface of the clean liquid 20.

Figure 4:
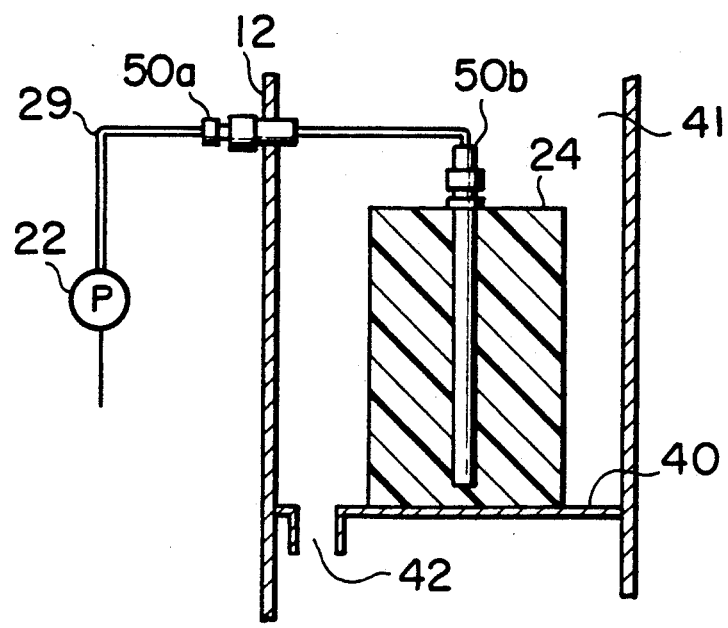
FIG. 4 is a detailed sectional view of a filtering means and a filter tank of the filtering apparatus for processing liquids shown in FIG. 3.

FIG. 4 is a detailed drawing of the configuration which shows the connection between the filter 24 and a pump 22. In the drawing, reference numerals 50a, 50b denote connection means which are provided at intermediate positions of a hose 29 and which can be simply attached and detached by a non-touch operation.

Figure 1:
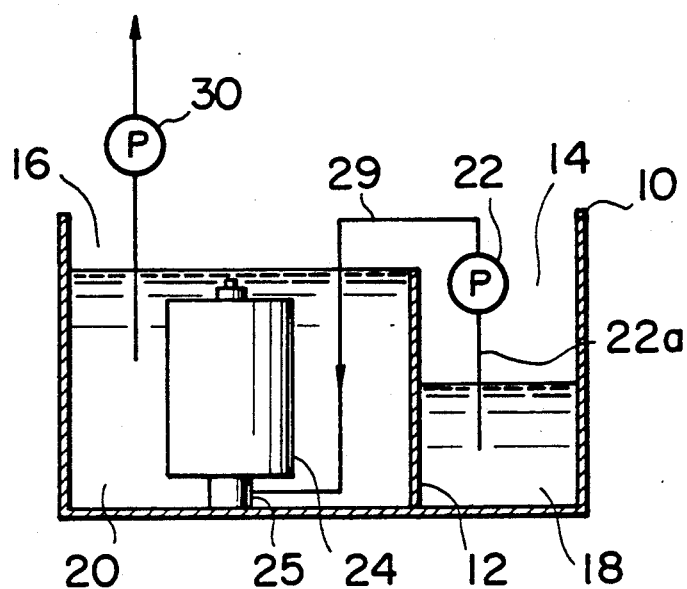
FIG. 1 is a schematic sectional view of a conventional filtering apparatus for processing liquids.
Figure 2:
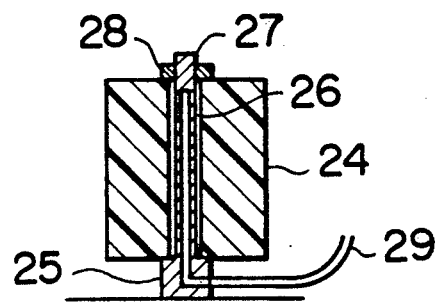
FIG. 2 is a detailed sectional view of a filtering means of the filtering apparatus for processing liquids shown in FIG. 1.

In FIGS. 3 and 4, the same reference numerals as those in FIGS. 1 and 2 provided for explaining a conventional filter denote the same or corresponding portions.

A description will now be given of the operation of the filter for processing liquids of the present invention. The contaminated liquid 18 stored in the contaminated liquid tank 14 is supplied to the filter 24 through the hose 29 by the pump 22 which is constantly operated. The contaminated liquid 18 is then filtered by the filter 24 with the aid of the pressure of the pump 22 so that the processing powder contained in the contaminated liquid 18 remains in the filter 24, and the processing liquid is discharged as the clean liquid 20 into the filter tank 41. The clean liquid 20 discharged is caused to fall into the clean liquid tank 16 from the shoot 42 in the filter tank 41.

When the processing powder remain in the filter 24 and causes the clogging of the filter 24, either of the connection means 50a and 50b is operated so that the filter can be easily removed.

The filter 24 can be easily changed by a simple operation, therefore, since no processing powder is caused to fall into the clean liquid tank 16 and the filter 24 contains only a small amount of processing liquid.

Figure 5:
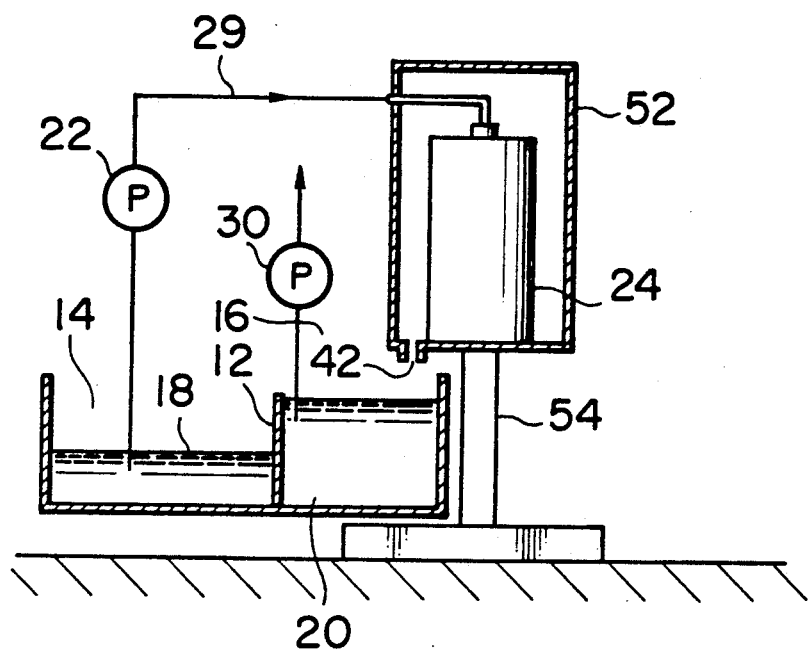
FIG. 5 is a schematic sectional view of a filtering apparatus for processing liquids in accordance with another embodiment of the present invention.

Another embodiment of the present invention will be described below with reference to the drawings. In FIG. 5, a filter 24 is received in a filter tank 52 which is supported by a support base 54.

Figure 6:
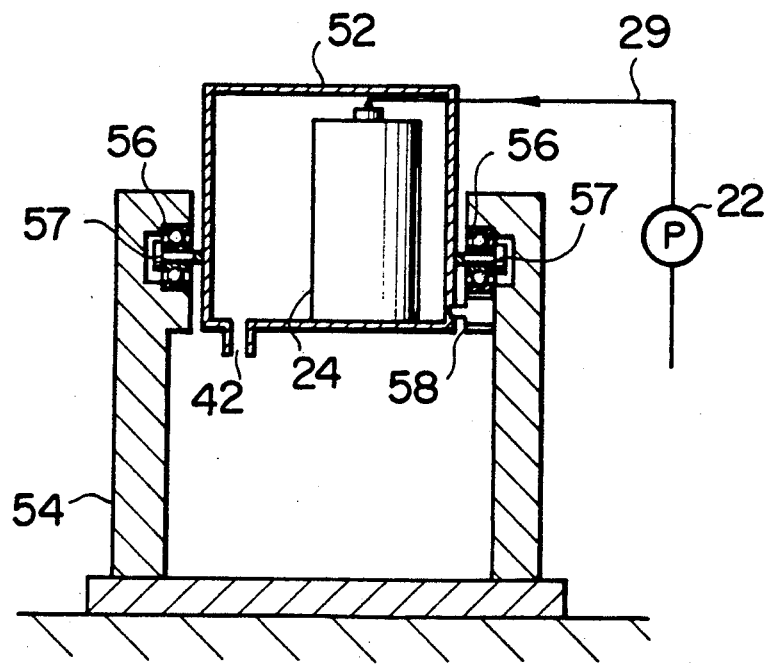
FIG. 6 is a partially-broken away side view of a filter tank and a supporting base of the filtering apparatus for processing liquids shown in FIG. 5.

FIG. 6 is a partially-broken away side view of the filter tank 52 and the supporting base 54 shown in FIG. 5. In the drawing, a bearing 56 for allowing the filter tank 52 to be rotatably supported by the support base 54 is provided on the support base 54, and a plunger 58 for enabling the filter tank 52 to be fixed at any desired position is also provided on the support base 54. The filter tank 52, the support base 54, the bearing 56 and the plunger 58 form receiving means.

Although omitted in FIGS. 5 and 6, connection means 50a, 50b are interposed between the filter 24 and the pump 22, as the same way as in FIG. 4. The same reference numerals as those in FIG. 1 denote the same or corresponding portions.

The operation of this embodiment is described below. Since the operation of circulating the processing liquid and the operation of separating the filter 24 from the pump 22 are the same as those in the first embodiment, these operations are not described below. A case in which the filter 24 is changed is described below.

When the filter 24 is changed, the plunger 58 is first released so that the filter tank 52 is stored around a rotational shaft 57. The plunger 58 is then again operated at a position where the filter tank 52 is substantially in parallel so that the filter tank 52 is fixed. In this state, the filter 24 is changed, or the maintenance thereof is performed.

It is therefore possible to easily change the filter 24 and perform the maintenance thereof.

Although the above-described embodiment is configured so that the filter tank 52 is rotated, when the filter tank is provided so as to be elevated from the clean liquid tank 16, the same effect as in the above embodiment is exhibited.

Figure 7:
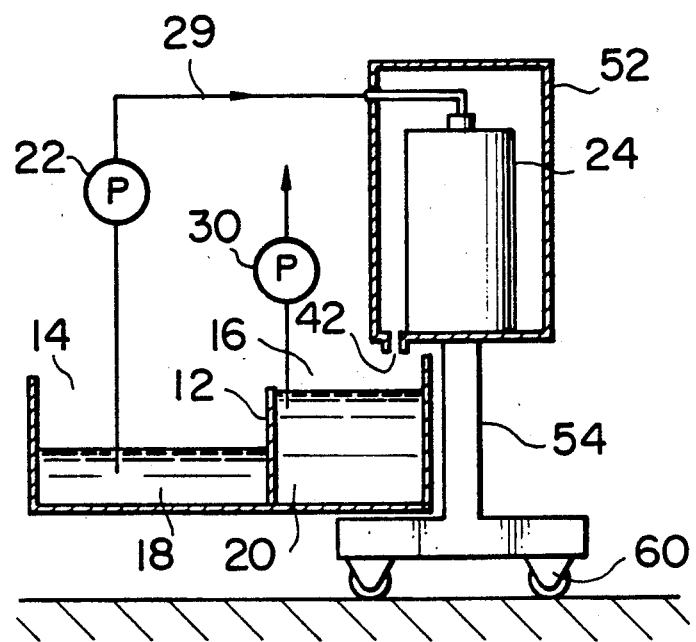
FIG. 7 is a schematic sectional view of a filtering apparatus for processing liquids in accordance with a further embodiment of the present invention.

A filter for processing liquids in a further embodiment of the present invention is described below with reference to the drawings. In FIG. 7, a caster 60 is provided in a lower portion of a support base 54 so that a filter tank 52 can be moved together with the support base 54. The filter tank 52, the support base 54 and the caster 60 form receiving means.

Although not shown in FIG. 7, connection means 50a, 50b are interposed between a filter 24 and a pump 22 in the same way as in FIG. 4. The same reference numerals as those in FIG. 1 and FIG. 5 provided for explaining another embodiment of the present invention denote the same or corresponding portions.

The operation of this embodiment will be described below. Since the operation of circulating the processing liquid and the operation of separating the filter 24 from the pump 22 are the same as those in the above-described embodiment, these operations are not described below, and the case in which the filter 24 is changed is described below. After either the connection means 50a or 50b has been operated, the filter tank 52 is moved to a desired place by the caster 60 for the purpose of changing the filter 24 or performing the maintenance. This operation need not be performed in a place around the filter for the processing liquid and there is thus no need for keeping an additional maintenance space.

Although each of the embodiments is provided with the filter 24 having only one contaminated liquid inlet port, a filter having a through hole, as the same way as in conventional filters, may be of course used, with one opening being covered with a blind patch or the like.

What is claimed is:

1. A filtering apparatus for processing liquids comprising:
   a contaminated liquid tank for storing a contaminated liquid used in processing;
   filtering means for removing contaminates from said contaminated liquid to produce a clean liquid;
   means for supplying said contaminated liquid in said contaminated liquid tank to said filtering means;
   a filter thank containing said filtering means therein and having an outlet for causing said clean liquid discharged from said filtering means to flow out; and
   a clean liquid tank for storing said clean liquid caused to flow out from said outlet of said filter tank,
   said filtering means being detachably connected to said means for supplying said contaminated liquid to said filtering means and disposed at a level higher than the surface of said clean liquid in said clean liquid tank, said filter tank being movably supported by a support base;
   wherein said contaminated liquid tank, said filter tank and said clean liquid tank are separated from each other by a partition plate and provided in the same tank.

* * * * *